Patented July 24, 1951

2,561,791

UNITED STATES PATENT OFFICE 2,561,791

ALIPHATIC UNSATURATED, BRANCHED-CHAIN SICCATIVES

William E. Elwell, Berkeley, and Zephaniah H. Ballmer, Jr., Lafayette, Calif., assignors to California Research Corporation, San Francisco, Calif., a corporation of Delaware No Drawing. Application July 6, 1948,
Serial No. 37,319

7 Claims. (Cl. 106—310)

This invention relates to driers or siccatives for varnishes, lacquers, oil colors, writing and printing inks, and plastic masses which contain drying oils, and more particularly, to novel polyvalent metal driers prepared from condensation products derived from unsaturated, branched-chain polymeric olefins, and alpha-beta unsaturated aliphatic acids and to compositions of matter prepared therefrom, and to the processes for their preparation.

In recent years the prior art of paint industry has evolved to the point where, instead of cooking metallic compounds, such as cobalt oxide or carbonate, with linseed oil with an attendant fire hazard, it prefers to add liquid driers to a base drying oil (frequently containing pigments), thereby avoiding use of any heat and, consequently, all fire hazards. And by liquid driers we mean polyvalent metal salts of oil-soluble carboxylic acids dissolved in a thinner, which solution is desirably compatible with drying oils and which accelerates the drying time of said drying oil. Thus, for example, the saturated cycloparaffinic carboxylic acids otherwise known as naphthenic acids, have been previously used in liquid drier compositions in the form of their metallic salts.

The problem of incorporating sufficient amounts of polyvalent metal drier into thinner solvents, which solvents are compatible with drying oils, has been a vexatious one in the paint industry. When the polyvalent metal salts of high molecular weight straight chain, saturated or unsaturated carboxylic acids are used, they generally do not dissolve in thinner solvent sufficiently well to yield liquid driers of a desirable 6 per cent metal content. In the few cases where 6 per cent metal content is obtainable with the said high molecular weight straight chain carboxylic acids, the solubility characteristics of the concentrated solution are such that the liquid drier gels on standing. This gelation frequently is so bad as to produce a hard mass in the container, and obviously such driers are no longer liquid and are therefore extremely difficult, if not impossible additions to a drying oil.

The production of liquid driers of 6 per cent or more metal content is highly desirable for ease of handling and to avoid the addition of excessive amounts of undesirable thinner to the drying oil. In normal practice, using such a highly concentrated liquid drier solution, the use of about 5 cc. of drier per quart of drying oil or paint product is sufficient.

It is therefore readily seen that concentrated liquid driers are highly desirable in the art. Attempts to attain such high concentrations using naphthenic acid driers, necessitate the use of excess free naphthenic acid since the neutral metal naphthenates are unstable and gel on aging, with a consequent increase of viscosity. The amount of excess acid required to prevent such gelation amounts to about 10 to 15 per cent over and above the amount required to neutralize the metal used in the preparation of the metal naphthenate drier. Such an excess of acid is disadvantageous for the drying rate of the subsequently compounded drying oil as well as being bad for the durability of the paint film, and this excess acid may even react with the pigments, in the case of pigmented drying oil compositions, to cause livering and gelation therein.

It is thus seen that a suitable liquid drier requires compatability with drying oils, with or without pigments, and freedom from formation of stringiness, curdling or gelation in the ultimate drying oil composition. This compatibility of the liquid drier in the drying oil medium is of course desired, over and above the question of compatibility of the metallic drier per se in its liquid drier solvent (thinner) medium.

Thus it is readily understood that the preparation of a drier having the foregoing combination of desirable properties is not generally capable of prediction, with the result that compounding paints is, to this day, considered an art and not a predictable science.

It is an object of this invention to prepare new and useful synthetically prepared carboxylate metallic driers having a branched-chain unsaturated olefinic polymeric structure as an essential constituent thereof.

It is also an object of this invention to prepare a new class of metal carboxylate driers in dry, or more preferably, in solution form and capable of economical preparation and suitable for use in mixtures of such modern paints as those comprising various synthetic organic materials, such as the various alkyd resins, the various urea-formaldehyde resins, the numerous phenol-formaldehyde resins, and the like.

Still another object of this invention is to obtain relatively low molecular weight olefinic polyvalent drier metal salts having a branched-chain structure which show good solubility in liquid thinner type solvents, such as naphtha, Stoddard solvent, and the like, in order to prepare liquid drier compositions of high polyvalent drier metal content.

Still another object of this invention is to produce novel non-acidic drier salts which, at high concentration in liquid thinner solvent, will give a free-flowing liquid drier, devoid of a tendency to body or to form a gel, or to become cloudy or stringy on storage.

It is also an object of this invention to prepare a metallic paint drier that yields a clear, non-curdled, non-stringy and homogeneous solution when mixed with thinner, such as Stoddard solvent, or a base oil, such as linseed or oiticica oil, and the like.

Other objects will become apparent from the body of the disclosure.

We have discovered that drier metal salts of certain synthetically prepared unsaturated acids, which acids are prepared by condensation of polymers of low molecular weight olefins, such as ethylene, propylene, butylene, and the like, with an alpha-beta unsaturated aliphatic acid, such as crotonic acid, are excellent driers for drying oils and, furthermore, we have discovered that they exhibit excellent color, linseed oil and thinner solvent compatibility, and other valuable properties desired in a paint drier. Thus, for example, we found that when propylene trimer is condensed with crotonic acid there is obtained a highly branched-chain nonenyl butyric acid, whose cobalt soaps, also merely by way of example, are excellent paint driers of exceptionally good color, odor and oil, as well as thinner solvent, compatibility.

We have, moreover, discovered that in general any olefin polymer of about 6 to 20 carbon atoms and possessing a highly branched-chain structure, along with an unsaturated olefinic bond, is suitable for the condensation with an alpha-beta unsaturated aliphatic acid, and that one obtains as a reaction product an unsaturated branched-chain carboxylic acid whose polyvalent metallic salts constitute the driers of our invention. The olefin polymers of our invention are prepared from normally gaseous olefins, such as ethylene, propylene, butylene, and the like, by well-known polymerization processes, while the class of acids we use is exemplified by crotonic acid, but alpha-beta unsaturated acids of from 3 to about 8 carbon atoms are quite satisfactory in the preparation of our condensed branched-chain unsaturated carboxylic acids, which we find useful as a source material for the preparation of our metallic driers. By way of examples illustrating the range of equivalents, we find that tri- or di-isobutylene may be used in lieu of polypropylene trimer, and that angelic acid may be substituted for the preferred crotonic acid, to give entirely satisfactory branched-chain olefinic carboxylic acid condensates useful in the preparation of our polyvalent metal drier salts.

The metallic salts, i. e., soaps, prepared from our acid condensation products by reaction with the commonly used polyvalent drier metal compounds such as, for example, the oxides, sulfates, carbonates, etc. of cobalt, lead, manganese, calcium, zinc, iron, and the like, have the property of being completely compatible with paint thinners, such as Stoddard solvent and the like, to give clear, homogeneous, non-stringy and non-curdling liquid driers of high drier metal concentration and low viscosity, even on subsequent storage of prolonged duration. This surprising and highly useful combination of properties we attribute to the highly branched-chain structure together with the unsaturation characteristics present in our driers and associated with the polymeric nature of our carboxylates.

In the polymerization of the normally gaseous olefins used in our invention, we employ such olefins as ethylene, propylene, butylene, and the like, under such operating conditions of temperature, pressure, reaction velocity, catalyst, and the like (conditions readily obtainable in the prior art) as to yield the desirable highly branched-chain polymeric olefins. Thus propene-1, when polymerized by these well-known methods, yields substantial amounts of side chain branching in its various polymeric unsaturated forms, such, for example, as in its trimers, tetramers, and the like. Likewise butene-1, polymerized by well known prior art methods, yields olefin polymers also containing substantial amounts of side chains and having an unsaturated structure.

The branched-chain structures present in our polymers persist, possibly with some isomerization, in our final metal drier salts, even after condensation with alpha-beta unsaturated carboxylic acids. Furthermore, these side chains, associated with an unsaturated bond, apparently lend a combination of valuable properties to our polyvalent metal drier salts; such properties as high solubility in thinner solvents without the use of extraneous acid, excellent compatibility with thinner solvents with avoidance of curdling, stringiness and insoluble residues in said thinner solvents even after prolonged standing, along with equally excellent compatibility with drying oils, whether pigmented or otherwise.

For purposes of clarifying the preparation of our unsaturated branched-chain polymers and merely by way of illustration, we have exemplified the preparation of our metal paint driers in detail starting from a simple unbranched olefin and ending with the desired polyvalent metal drier. It is to be understood that equivalent variations as to temperature, pressure, feed rates, catalysts, and similar variable quantities are also a part of our invention.

*Example 1.—Preparation of propylene trimer*

500 cc. of a catalyst consisting of charcoal impregnated with 75% phosphoric acid were placed in a vertical steel tube surrounded by a heating jacket. The catalyst was heated to 200° C. and propylene was fed downward through the catalyst bed at a rate of 0.6 v./v./hour at a gauge pressure of 300 pounds per square inch. The propylene polymerized and the polymers plus unreacted propylene were withdrawn from the bottom of the catalyst chamber at a rate such as to maintain the internal gauge pressure at 300 pounds per square inch. The reaction product was stabilized, decolorized by percolation through fuller's earth and fractionally distilled. The trimer fraction, mostly nonenes, boiled between 104° C. and 165° C. and had a bromine number of 126.

*Example 2.—Preparation of nonenyl butyric acid*

6.3 mols of the trimer prepared according to Example 1 and 3.0 mols of crotonic acid were sealed in a steel vessel. The mixture was heated to 200° C. for 5 hours, cooled, and fractionally distilled. The unreacted material was removed at atmospheric pressure as forerun. The desirable condensate of nonenyl butyric acid was removed under reduced pressure by distillation up to 255° C. at 50 mm. Hg. pressure. The fraction containing nonenyl butyric acid was separated from residual crotonic acid by water washings and from residual polymeric olefins by extraction with caustic soda. The nonenyl butyric acid is obtained by treating the sodium salt with a stoichiometrical amount of hydrochloric acid. The nonenyl butyric acid is a clear, oily liquid that decolorizes bromine water rapidly. This nonenyl butyric acid gave the following carbon value on analysis:

|  | Calculated | Found |
|---|---|---|
| Per cent carbon | 73.5 | 73.8 |

*Example 3.—Preparation of cobalt nonenyl butyrate*

9.5 grams of nonenyl butyric acid were neutralized with a dilute solution of sodium hydroxide to form an aqueous solution of the sodium soap. An excess amount of cobalt sulfate was added to the soap solution and the cobalt nonenyl butyrate formed immediately, as an insoluble material. The cobalt soap was extracted from this aqueous solution by means of Stoddard solvent. The solvent extract was then evaporated until the concentration of cobalt metal was about 5.8%. At this concentration, the drier was completely compatible with the Stoddard thinner and exhibited a desirable low viscosity as shown by the following properties:

| | |
|---|---|
| Color | Deep violet |
| Clarity | Clear |
| Residue | None |
| Viscosity[1] | A-3 |
| Gellation in solution | None visible |

[1] Gardner-Holdt.

It is thus apparent that the drier salt of our acid condensation product yields a liquid drier of high concentration without residue and without gellation, and of low viscosity and excellent clarity.

One part by volume of this concentrated drier solution of Example 3 was added to 19 parts by volume of linseed oil and the mixture was thoroughly shaken, resulting in a clear, homogeneous solution. No curdling, stringing or formation of insoluble residue occurred, thereby indicating complete compatibility between our novel liquid drier and linseed oil.

It will be seen from Example 3 supra that the compatibility of our novel driers with linseed oil, the most commonly used base oil, is such as to yield clear, homogeneous solutions exhibiting neither curdling nor stringing nor formation of insoluble residue, in contrast to presence of such disadvantages frequently present in driers prepared from high molecular weight fatty acids and oxidized paraffins.

Furthermore, we have found that our polyvalent metal liquid driers, while preferably used at about 6 per cent metal concentration, particularly with respect to cobalt metal, may nevertheless be used at a concentration greater than 6 per cent metal without gel formation. Thus concentrations of up to about 8 per cent metal cobalt in the cobalt liquid driers of our invention are feasible and concentration as low as 0.1 per cent are useful for special purposes. Similar concentrations of other polyvalent metals of our drier acids are likewise free of gelation.

Aside from the valuable properties enumerated above, we have also discovered that the metal driers of our invention are per se very valuable driers, comparable in drying power to such cobalt driers as those obtainable from 2-ethyl hexoic, fencholic or naphthenic acid as more fully presented in the following example:

*Example 4.—Drying action of cobalt nonenyl butyrate*

The following vehicle formulations were prepared by adding liquid drier. The lead naphthenate liquid drier contained 24% lead metal. The cobalt liquid driers contained about 6% cobalt metal in the case of both cobalt nonenyl butyrate and cobalt naphthenates; the latter containing excess naphthenic acid as previously mentioned.

FORMULATION

| | Vehicle A | Vehicle B | Vehicle C |
|---|---|---|---|
| Drier Formulation 1: | | | |
|   lead naphthenate | 0.6% Pb | 0.6% Pb | |
|   cobalt naphthenate | 0.03% Co | 0.03% Co | |
| Drier Formulation 2: | | | |
|   lead naphthenate | 0.6% Pb | 0.6% Pb | |
|   cobalt nonenyl butyrate | 0.03% Co | 0.03% Co | |
| Formulation 3: cobalt naphthenate | | 0.03% Co | 0.03% Co |
| Formulation 4: cobalt nonenyl butyrate | | 0.03% Co | 0.03% Co |

Vehicle A was linseed oil bodied to Q (Gardner-Holdt) viscosity. Vehicle B alkyd resin was prepared by condensation of phthalic anhydride and soyabean oil monoglyceride and contained about 25 per cent phthalic anhydride (Glyptal No. 2466—General Electric Co.). Vehicle C was unbodied linseed oil. Films of each of these formulations were flowed onto glass panels and drying noted as below:

DRYING TIMES

| | Set to Touch | Dust Free | Tack Free |
|---|---|---|---|
| Vehicle A (films 0.001″ thick): | Hours | Hours | Hours |
|   Drier formulation 1 | 3 | 4 | 5 |
|   Drier formulation 2 | 3 | 4 | 5 |
| Vehicle B (films 0.0015″ thick): | | | |
|   Drier formulation 1 | 2 | 2.5 | 3 |
|   Drier formulation 2 | 2 | 2.5 | 3 |
|   Drier formulation 3 | 1.5 | 2 | 4 |
|   Drier formulation 4 | 1.5 | 2 | 4 |
| Vehicle C—Drier formulation 3 | 4 | 6 | 12 |
| Vehicle C—Drier formulation 4 | 4 | 6 | 12 |

It is apparent from the above drying times that the drying action of cobalt nonenyl butyrate is comparable to that of acid-containing cobalt naphthenate and that the said cobalt nonenyl butyrate is compatible with various drying oils or drying oil containing vehicles. Thus the highly branched-chain unsaturated metal driers of our invention yield the much desired combination of high concentration of metal in thinner type solvents with a desirable low viscosity (A-3, Gardner-Holdt). Our liquid driers are, furthermore, completely compatible with drying oils and are excellent driers per se.

While we have exemplified the compatibility of our cobalt driers, prepared from olefin polymers and alpha-beta unsaturated acids, with lead naphthenate and an equal weight mixture of cobalt naphthenate admixed with lead naphthenate in such vehicles as linseed oil and soybean oil alkyd, nevertheless, other oils such as dehydrated castor oil, tung oil, and the like and other alkyd mixtures are also applicable. Furthermore, while we have illustrated our invention by way of a few specific examples, nevertheless, various combinations of olefin equivalents and crotonic acid equivalents, as well as polyvalent metal equivalents, are deemed to be within the scope of our invention as more fully defined in the appended claims.

We claim:

1. As a new liquid drier composition, a solution consisting essentially of a volatile hydrocarbon thinner and from 0.1 to about 8% of a polyvalent metal in the form of a salt acyclic mono-olefin polymer-substituted alpha, beta unsaturated aliphatic carboxylic acid, wherein the acyclic mono-olefin polymer substituent has a branched-chain structure of 6 to 20 carbon atoms, said alpha, beta unsaturated aliphatic carboxylic acid having from 3 to 8 carbon atoms prior to said substitution, said solution being characterized by its compatibility with drying oils and stability against gelation on storage.

2. A liquid drier composition, as defined in claim 1, wherein said polyvalent metal is cobalt, said acyclic mono-olefin polymer substituent is a propylene polymer having a branched-chain structure of 9 carbon atoms and said alpha-beta unsaturated carboxylic acid is crotonic acid.

3. As a new siccative compatible with drying oils, a polyvalent metal salt of an acyclic mono-olefin polymer-substituted alpha, beta unsaturated aliphatic carboxylic acid, said acid having not more than about 8 carbon atoms prior to said substitution, and its acyclic mono-olefin polymer substituent containing from 6 to 20 carbon atoms.

4. As a new siccative compatible with drying oils, a polyvalent metal salt of an acyclic mono-olefin polymer-substituted alpha, beta unsaturated aliphatic carboxylic acid, said acid having not more than 8 carbon atoms prior to said substitution, and its acyclic mono-olefin polymer substituent having a branched chain structure of 6 to 20 carbon atoms.

5. As a new siccative compatible with drying oils, a divalent metal salt of an acyclic mono-olefin polymer-substituted alpha, beta unsaturated aliphatic carboxylic acid, said acid having not more than 8 carbon atoms prior to said substitution, and its acyclic mono-olefin polymer substituent having a branched chain structure of 6 to 20 carbon atoms.

6. As a new siccative compatible with drying oils, a polyvalent metal salt of an acyclic mono-olefin polymer-substituted alpha, beta unsaturated aliphatic carboxylic acid, said acid having from 3 to 8 carbon atoms prior to said substitution, and its acyclic mono-olefin polymer substituent having a branched chain structure of 6 to 20 carbon atoms and being a polymer of a normally gaseous acyclic mono-olefin.

7. As a new siccative compatible with drying oils, a cobalt salt of an acyclic propylene polymer-substituted crotonic acid, its propylene polymer substituent having a branched chain structure of 9 carbon atoms.

WILLIAM E. ELWELL.
ZEPHANIAH H. BALLMER, Jr.

REFERENCES CITED

The following references are of record in the file of this patent:

UNITED STATES PATENTS

| Number | Name | Date |
|---|---|---|
| 2,072,770 | Reid | Mar. 2, 1937 |
| 2,075,230 | Schatz | Mar. 30, 1937 |
| 2,468,769 | Morris et al. | May 3, 1949 |
| 2,488,550 | Morris et al. | Nov. 22, 1949 |